Patented Apr. 8, 1952

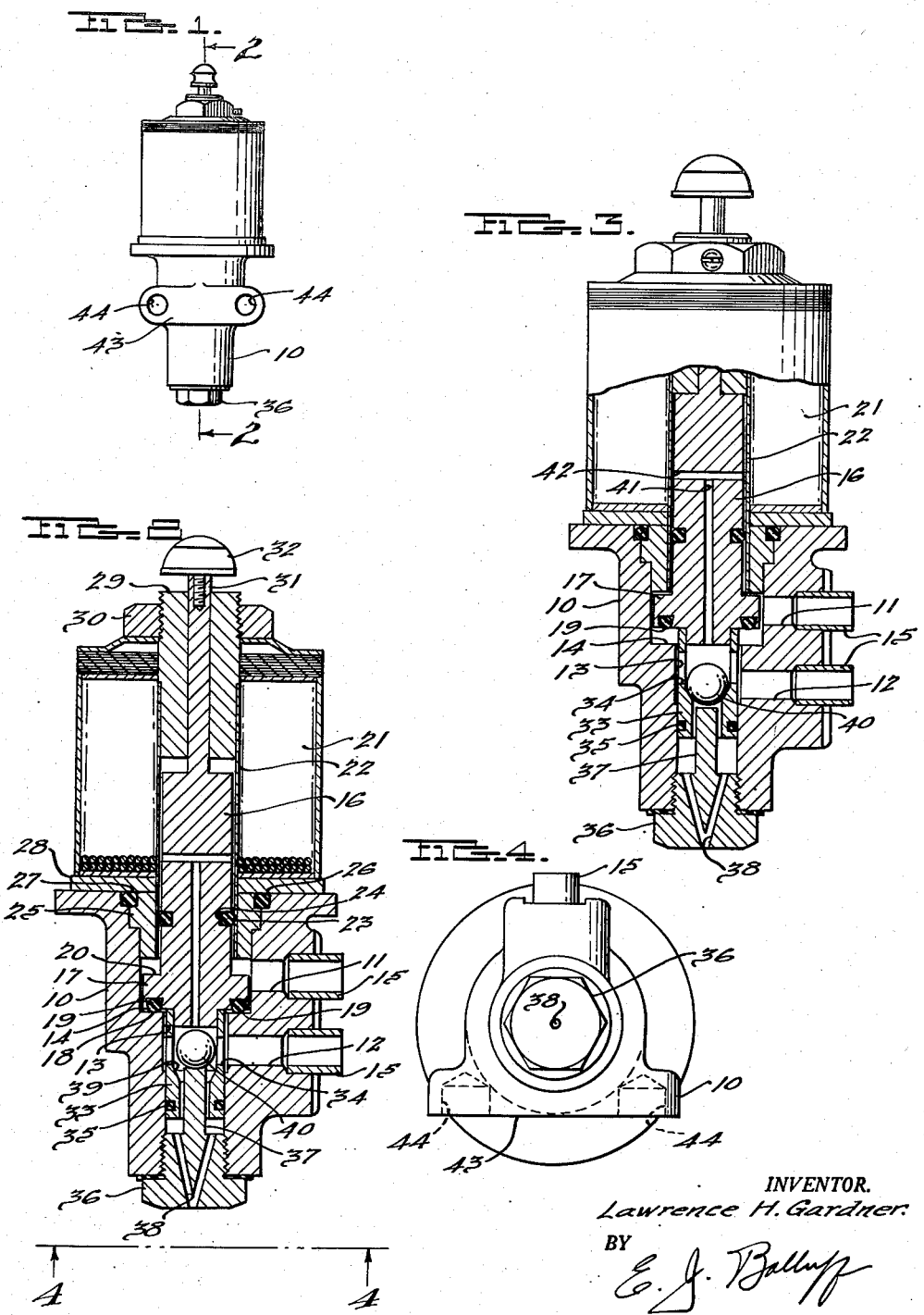

2,591,801

UNITED STATES PATENT OFFICE 2,591,801

VALVE STRUCTURE

Lawrence H. Gardner, Lakewood, Ohio

Application June 11, 1949, Serial No. 98,589

7 Claims. (Cl. 137—144)

This invention relates to valve structure and has particular reference to new and useful improvements in a direct solenoid operated valve.

The type of valve to which this invention relates may be used to control the flow of a fluid to and from a work cylinder or other such device as may be used.

A principal object of the invention is to provide a new and improved valve of the type described.

A further object of the invention is to provide a valve of the type described which is reliable and inexpensive and having a wide range of utility.

Other and further objects of the invention will be apparent from the following description and claims and will be understood by reference to the accompanying drawing, of which there is one sheet, which by way of illustration shows a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a side elevational view of a valve embodying the invention;

Fig. 2 is a sectional view of the valve in its closed position, taken along the line 2—2 of Fig. 1;

Fig. 3 is a sectional view of the valve similar to Fig. 2 but showing the valve in its open position; and Fig. 4 is an end elevational view of the valve, looking in the direction of the arrows 4—4 of Fig. 2.

Referring more particularly to the drawing, the valve structure embodying the invention has a valve casing 10, an inlet port 11, a working cylinder port 12, a fluid passage 13, and a valve seat 14 therebetween. The ports 11 and 12 are provided with bushings or coupling members 15 which may be connected to a fluid flow system in any suitable manner. Inlet port 11 may be connected to a fluid pressure line (not shown), and port 12 to a work cylinder or other such device (not shown). The valve member 16 has a circular head 17, and an annular groove 18 in the head 17 is supplied with an O-ring 19. The O-ring is of soft, resilient material and is presented to the valve seat 14, and when engaged with the valve seat 14 provides an effective seal between the ports 11 and 12.

With the valve in its closed position, fluid under pressure entering the port 11 acts upon a shoulder 20 of the head 17 of valve member 16 to hold the valve member in engagement with the valve seat 14, as shown in Fig. 2.

A solenoid 21 is provided with a sleeve member 22 through which the valve member 16 is slidingly arranged. An O-ring 23 of sealing material is carried in a groove 24 of valve member 16 and forms a sliding seal between the sleeve 22 and valve member 16. An annular bushing 25 is secured on sleeve 22 and within the casing 10. The casing 10 and bushing 25 cooperate to form an annular groove 26 which carries an O-ring 27 of sealing material. A circular plate 28 surrounds sleeve 22 and is suitably secured to the casing 10. The solenoid 21 is secured to the plate 28. The O-ring 27 forms a seal between the interior of the valve and the atmosphere. The sleeve 22 is closed at its upper end by the plug 29. Plug 29 is secured to the solenoid casing by a nut 30.

A stem 31 of the valve member 16 is slidably arranged through the plug 29. Upon energization of the solenoid 21 the valve 16 is moved from its closed position shown in Fig. 2 to the open position shown in Fig. 3. The cap 32 is secured on the end of the stem 31 to allow manual or mechanical operation of the valve if desired. The solenoid is provided with a suitable connection to a source of electric energy (not shown) for energizing the solenoid so as to open the valve.

A hollow sleeve 33 is secured to the lower end of the valve member 16 and has an opening 34 therethrough normally aligned with the work port 12. The sleeve 33 has an O-ring 35 of sealing material carried in an annular groove on its surface. The O-ring forms a sliding seal between the sleeve 33 and the central passage of the casing 10.

A plug 36 is threadedly secured in the casing 10 and has a stem 37 projecting into the sleeve 33 through a central bore in sleeve 33 of larger diameter than the stem 37. The plug 36 is provided with exhaust outlets 38 so that in the closed position of the valve the work port 12 is in communication with the exhaust port 38. The hollow sleeve 33 has an annular valve seat 39 formed therein. A ball 40 is supported by the stem 37 of the plug 36 above the valve seat 39 during closed position of the valve. When the solenoid is energized the sleeve 33 is carried by valve member 16 to its upper position and valve seat 39 is carried into engagement with ball 40, thus closing off the work port 12 from exhaust port 38 as shown in Fig. 3.

The fluid entering the inlet port 11 is now free to flow into work port 12. Two intercommunicating passages 41 and 42 are formed in valve member 16 and form a connection between the fluid inlet port 11 and the interior of sleeve 22 above the sealing ring 23 so as to prevent any dashpot action between the valve member 16 and the sleeve 22.

In the open position of the valve the fluid under pressure holds the ball 40 firmly on its seat 39 to prevent any fluid from escaping through the exhaust ports 38. When the solenoid is deenergized, the force of gravity in combination with the fluid pressure acting upon the ball 40 and sleeve 33 will return the valve member 16 to its closed position where it will be held by fluid pressure exerted on the shoulder 20 of the valve member 16.

As shown in Fig. 4, the casing 10 may be provided with a surface 43 and holes 44 for securing the casing to the fluid flow system with which it is to be used. Any suitable method may be used for this purpose, and it is understood that the invention is not to be limited to the method shown.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. A valve of the type described comprising a valve body having a central passage therethrough, an inlet port and a work port in said body communicating with said passage, an annular valve seat formed within said passage between said ports, a valve member arranged for reciprocal movement within said passage and having an enlarged annular shoulder at the end thereof adjacent said valve seat, said shoulder having an annular sealing ring in the face presented toward said valve seat engageable with said valve seat for closing said passage between said ports, said valve member being held in engagement with said valve seat by fluid pressure from said inlet, a solenoid secured on one end of said casing operative upon said valve member to disengage the same from said valve seat, a plug in the other end of said casing having an exhaust port therein in communication with said work port when said valve is in its closed position, a hollow sleeve carried by said valve member on the end thereof adjacent said valve seat, said hollow sleeve being slidingly disposed through said passage in said casing and having an annular valve seat formed therein, a stem on said plug extending into said hollow sleeve and supporting a ball within said sleeve, said ball being engageable with said valve seat in said hollow sleeve for sealing off said work port from said exhaust port when said valve member is disengaged from its seat.

2. A valve of the type described comprising a valve body having a central passage therethrough, an inlet port and a work port in said body communicating with said passage, an annular valve seat formed within said passage between said ports, a valve member arranged for reciprocal movement within said passage and having an enlarged annular shoulder at the end thereof adjacent said valve seat, said shoulder having an annular sealing ring in the face presented toward said valve seat engageable with said valve seat for closing said passage between said ports, said valve member being held in engagement with said valve seat by fluid pressure from said inlet, a solenoid secured on one end of said casing operative upon said valve member to disengage the same from said valve seat, a plug in the other end of said casing having an exhaust port therein in communication with said work port when said valve is in its closed position, a hollow sleeve carried by said valve member on the end thereof adjacent said valve seat, said hollow sleeve being slidingly disposed through said passage in said casing and having an annular valve seat formed therein, a stem on said plug extending into said hollow sleeve and supporting a ball within said sleeve, said ball being engageable with said valve seat in said hollow sleeve for sealing off said work port from said exhaust port when said valve member is disengaged from its seat, said hollow sleeve forming part of the communicating passage between said work port and said exhaust port.

3. A valve of the type described comprising a valve casing having an axial passage therethrough, an inlet port and a work port in said casing communicating with said passage, an annular valve seat formed in said casing between said ports, a solenoid secured on one end of said casing, a sleeve carried by said solenoid, a valve stem slidingly arranged within said sleeve and having an annular valve face on the end thereof remote from said solenoid, said valve face having an annular sealing ring engageable with said valve seat for closing said passage between said ports, an annular sealing ring arranged on said valve stem to provide a sliding seal between said valve stem and said sleeve, a passage within said valve stem between said valve face and the interior of said sleeve, said passage by-passing said sliding sealing means, said solenoid being operative upon said valve stem when energized so as to disengage the same from said valve seat, a plug in the other end of said casing having an exhaust port communicating with said work port when said valve is in its closed position, a hollow sleeve secured to said valve stem on the end thereof adjacent said valve face, said hollow sleeve having an opening transversely of its longitudinal axis, at least a part of said opening being in alignment with said work port, an annular valve seat formed within said hollow sleeve, a stem on said plug extending into said hollow sleeve, said stem supporting a ball in said hollow sleeve above said valve seat in said hollow sleeve when said valve between said inlet and work ports is in closed position, said valve seat being carried into engagement with said ball upon energization of said solenoid so as to prevent the flow of fluid from said work port to said exhaust port.

4. A valve structure according to claim 3 wherein said hollow sleeve carried by said valve stem is provided with an annular sealing ring forming a sliding seal between said sleeve and said casing.

5. A valve structure according to claim 3 wherein said valve stem has one end thereof extending through said solenoid, said reduced end of said valve stem being provided with a cap so as to provide a means of manually operating said valve from one of said positions to the other of said positions.

6. A valve of the type described comprising a valve casing having a central passage therethrough, an inlet port and a work port in said casing communicating with said passage, an annular valve seat in said passage between said ports, a valve member arranged within said passage having a part thereof engageable with said valve seat for closing said passage between said ports, a solenoid secured on one end of said casing and having a sleeve member through which said valve member is slidingly disposed, said solenoid being operative upon said valve member for disengaging the same from said valve seat when said solenoid is energized, a plug secured to the other end of said casing having an exhaust port communicating with said work port while said valve member is in engagement with said valve seat, and valve means for closing said exhaust port off from said work port when said valve member is unseated by said solenoid, said valve means for closing said exhaust port comprising a hollow sleeve carried by and movable with said valve member and having a valve seat formed therein between said exhaust port and said work port, and a movable valve closure member within said sleeve and adapted to be engaged by said valve seat in said sleeve for closing said exhaust port upon movement of said valve member to its unseated position, said plug having a part thereof loosely engaging said valve closure member for maintaining the same out of engagement with said valve seat in said sleeve when said valve member for closing said passage between said inlet and said work port is seated.

7. A valve of the type described comprising a valve casing having a central passage therethrough, an inlet port and a work port in said casing communicating with said passage, an annular valve seat in said passage between said ports, a valve member arranged within said passage at one end thereof and having a part thereof engageable with said valve seat for closing said passage between said ports, a solenoid secured to said casing and having a sleeve member through which said valve member is slidingly disposed, said solenoid when energized being operative upon said valve member for disengaging the same from said valve seat, a plug secured to the other end of said casing and having an exhaust port therein communicating with said passage, and valve means between said work port and said exhaust port comprising a hollow sleeve secured to and movable with said valve member and communicating with said work port and said exhaust port, said sleeve having an annular valve seat formed therein between said last-mentioned ports, and a ball valve within said hollow sleeve and adapted to seat on said valve seat in said sleeve when said valve member between said inlet port and said work port is unseated by said solenoid, said plug having a part thereof projecting into said sleeve and engageable with said ball valve so as to maintain the same off its seat when said valve member between said inlet port and said work port is seated.

LAWRENCE H. GARDNER.

REFERENCES CITED

The following references are of record in the file of this patent:

UNITED STATES PATENTS

| Number | Name | Date |
|---|---|---|
| 1,049,793 | Woods | Jan. 7, 1913 |
| 1,722,920 | Hynes | July 30, 1929 |
| 1,789,388 | Millan | Jan. 20, 1931 |
| 2,148,190 | Darling | Feb. 21, 1939 |

FOREIGN PATENTS

| Number | Country | Date |
|---|---|---|
| 248,592 | Switzerland | May 15, 1947 |
| 528,621 | Great Britain | Nov. 1, 1940 |